UNITED STATES PATENT OFFICE.

SUMIYUKI IKEDA, OF TOKYO, JAPAN, ASSIGNOR TO TOMODA GOSHI KAISHA, OF TOKYO, JAPAN, A CORPORATION OF JAPAN.

METHOD OF PREPARING GELATIN TUBES FOR MEDICINAL PURPOSES.

1,390,788.　　　Specification of Letters Patent.　Patented Sept. 13, 1921.

No Drawing.　　Application filed February 3, 1919. Serial No. 274,702.

*To all whom it may concern:*

Be it known that I, SUMIYUKI IKEDA, a subject of the Emperor of Japan, residing at No. 1 Yayesu-cho Itchome, Kojimachi-ku, city of Tokyo, Japan, have invented Methods of Preparing Gelatin Tubes for Medicinal Purposes, of which the following is a specification.

The present invention relates to the art of preparing gelatin tubes for hollow rods containing medicinal substances and its object is to obtain gelatin tubes for medicinal purpose by oiling the original rod with castor oil, then dipped in a gelatin solution for a short time and after drying the gelatin tube thus formed is drawn off from the rod.

It is well known that the hollow rod containing a medicinal substance is most effective for curing the inflammation of the urethra because of the fact that the outer tube of the hollow rod, after insertion in the urethra, is dissolved by the secrete of the same and the inner content of the tube contacts with the part affected gradually and for a comparatively long time. The characteristic point of the hollow rod lies in the fact that its outer tube is made of gelatin.

According to the present invention, a metallic original tube having a smooth surface and a diameter equal to that of the gelatin tube required, is oiled with castor oil and dipped into a warm gelatin solution consisting of 100 parts of gelatin and 300 parts of water. The rod is then drawn up from the solution, air dried and after the coagulation of the gelatin, the tube is drawn off from the rod. By employing the method of the present invention, the gelatin tube can be easily drawn off from the original rod without regard to the length and the size of the same or even when it is somewhat curved. The gelatin tube thus obtained retains its original form, having a smooth outer surface and its wall is uniform and thin. Thus, the gelatin tube prepared by the present method is the most ideal one for the purpose.

Having now described my invention, what I claim is:

A method of preparing a hollow gelatin rod for introducing a medicinal substance into the urethra, in which a rod is oiled with castor oil and dipped into a warm gelatin solution which is then dried and the hollow gelatin body is subsequently drawn off the original rod.

In testimony whereof I affix my signature in presence of two witnesses.

SUMIYUKI IKEDA.

Witnesses:
　K. KUROKAWA,
　K. MATSUNO.